United States Patent [19]
Katoh et al.

[11] Patent Number: 5,094,796
[45] Date of Patent: Mar. 10, 1992

[54] ELASTICALLY DEFORMABLE DIE AND METHOD OF DIE FORMING USING THE DIE

[75] Inventors: Masahito Katoh; Kenichi Hibino, both of Tsukuba, Japan

[73] Assignees: Agency of Industrial Science and Technology; Ministry of International Trade and Industry, Tokyo, Japan

[21] Appl. No.: 668,168

[22] Filed: Mar. 12, 1991

[30] Foreign Application Priority Data

Mar. 19, 1990 [JP] Japan .................................. 2-69497

[51] Int. Cl.$^5$ .............................................. B28B 3/00
[52] U.S. Cl. ...................................... 264/313; 72/60; 72/465; 100/211; 100/295; 425/403
[58] Field of Search ............... 264/313; 425/DIG. 44, 425/DIG. 124, 403; 72/56, 60, 465; 100/211, 295

[56] References Cited

U.S. PATENT DOCUMENTS

| | | | |
|---|---|---|---|
| 1,883,968 | 6/1930 | Krivig | 72/60 |
| 2,351,475 | 10/1941 | Berger | 264/313 |
| 2,966,873 | 1/1955 | Hoffman et al. | 72/57 |
| 3,520,961 | 7/1970 | Suda et al. | |
| 3,986,379 | 10/1976 | Mansell | 72/57 |
| 4,111,024 | 9/1978 | Dahlman et al. | 72/465 |

FOREIGN PATENT DOCUMENTS 1349833  7/1987  U.S.S.R. .................................. 72/57

Primary Examiner—David A. Simmons
Assistant Examiner—Merrick Dixon
Attorney, Agent, or Firm—Oblon, Spivak, McClelland, Maier & Neustadt

[57] ABSTRACT

An elastically deformable die includes two or more die members formed of materials exhibiting different degrees of elastic deformation under the same stress which are combined and arranged such that the elastic deformation thereof under the pressure received from a workpiece during a forming operation causes the surface of the die in contact with the workpiece to be formed to a prescribed configuration. In die forming the composite die is brought in contact with a surface of the workpiece, the die is elastically deformed at the surface of contact by the pressure received from the workpiece during the forming process, and the workpiece is formed to the prescribed configuration by this deformation.

10 Claims, 3 Drawing Sheets

ELASTICALLY DEFORMABLE DIE AND METHOD OF DIE FORMING USING THE DIE

BACKGROUND OF THE INVENTION

1. Field of the Invention

This invention relates to die forming by forming a material using a die, and more specifically to a composite die constituted of a plurality of die members formed of materials exhibiting different degrees of elastic deformation and to a method of die forming using the die in which a workpiece is formed to a desired shape by utilizing the different degrees of elastic deformation of the materials constituting the die members for controlling the elastic deformation of the die at the time of the forming operation.

2. Description of the Prior Art

In the field of die forming it is nowadays frequently necessary to subject a workpiece to a minute amount of forming on the micron order. This is true, for example, in the production of optical products, which often have to be imparted with minute changes in shape with high precision and good reproducibility.

In carrying out such forming by conventional die forming, the die is constituted and supported so as to resist elastic deformation. In producing a flat surface having minute irregularities (hills and valleys), therefore, it has been necessary to form the surface of the die to have a shape corresponding to the minute irregularities to be formed. With such a method, however, fabrication of the mold becomes increasingly difficult as the size of the irregularities becomes smaller.

In their earlier U.S. patent application Ser. No. 611,045, the inventors proposed a die forming method which overcomes this problem by using an elastically deformable die whose elastic deformation is controlled by the thickness distribution of the material constituting the die. While this earlier proposed method greatly simplifies the formation of minute irregularities, the fact that it utilizes the elastic deformation of a die having irregularities formed on its rear surface makes it necessary to use a thin die so that the application of the method to the processing of relatively hard materials such as metals is not possible unless special measures are adopted.

The object of this invention is to provide a die and a method of die forming using the die which, with a simple structural arrangement and without need for precision machining of the die surface, make it possible to impart minute changes in shape with high reproducibility to materials of both ordinary and high hardness.

SUMMARY OF THE INVENTION

For achieving the aforesaid purpose, the present invention provides an elastically deformable die comprising two or more die members formed of materials exhibiting different degrees of elastic deformation under the same stress which are combined and arranged such that the deformation caused by the pressure received from the workpiece during forming operation forms prescribed irregularities (hills and valleys) in the flat surface of the die and further provides a method of die forming in which a composite die constituted of a plurality of die members in the foregoing manner is brought in contact with a surface of a workpiece, the die is elastically deformed at the surface of contact by the pressure received from the workpiece during the forming process, and the workpiece is formed to a prescribed shape by this deformation.

Thus in accordance with the present invention if at the time of fabricating the die from the plurality of die members exhibiting different degrees of elastic deformation the type, size arrangement and the like of the die members are appropriately selected, it becomes possible to regulate the size and distribution of the irregularities that will be formed on the initially flat surface of the die under the pressure received thereby from the workpiece during the forming process and thus become possible to impart the desired configuration to the workpiece. In the specific case of forming a hard material, irregularities of the desired size and distribution can be easily formed by fabricating the die from materials exhibiting an appropriately small degree of elastic deformation. Since this means that there is no need to use thin materials, the formation of such hard materials can be readily conducted with good reproducibility.

The above and other objects and features of the invention will become apparent from the following detailed description with reference to the accompanying drawings.

DETAILED DESCRIPTION OF THE PREFERRED EMBODIMENT

In die forming techniques such as forging, casting, extrusion molding and the like, the die invariably receives pressure from the workpiece, although the degree of this pressure may differ between the different techniques. It is thus probable that the die will elastically deform, causing dimensional inaccuracies in the product. Since conventional thinking was that die deformation has to be avoided, die materials exhibiting small degrees of elastic deformation were selected and efforts were made to support the die so as to prevent it from deforming. In actual practice, however, there are cases in which deformation of the die cannot be avoided. This problem has been coped with by analyzing the deformation of the die (during forging, for example), and then modifying the die surface configuration based on the results of the analysis so as to improve the dimensional accuracy of the product.

In contrast, the approach of the present inventors was to accept die deformation as an intrinsic factor which can better be positively and effectively taken advantage of than be prevented or be compensated for by modifying the die surface shape according to the predicted deformation and, based on this logic, they accomplished the present invention.

More specifically, the elastically deformable die according to this invention comprises two or more die members formed of materials exhibiting different degrees of elastic deformation under the same stress which are combined and arranged such that the deformation caused by the pressure received from the workpiece during forming operation forms prescribed irregularities (hills and valleys) in the flat surface of the die, while the method of die forming according to the invention comprises the steps of bringing a composite die constituted of a plurality of materials in the foregoing manner in contact with a surface of the workpiece, allowing the die to be elastically deformed at the surface of contact under the pressure received from the workpiece during the forming process, and allowing the workpiece to be formed to a prescribed shape by this deformation.

The die forming using a composite die according to the invention can be applied to forging, casting, extrusion molding or any other type of forming insofar as it uses a die to form a workpiece.

Figure 1:
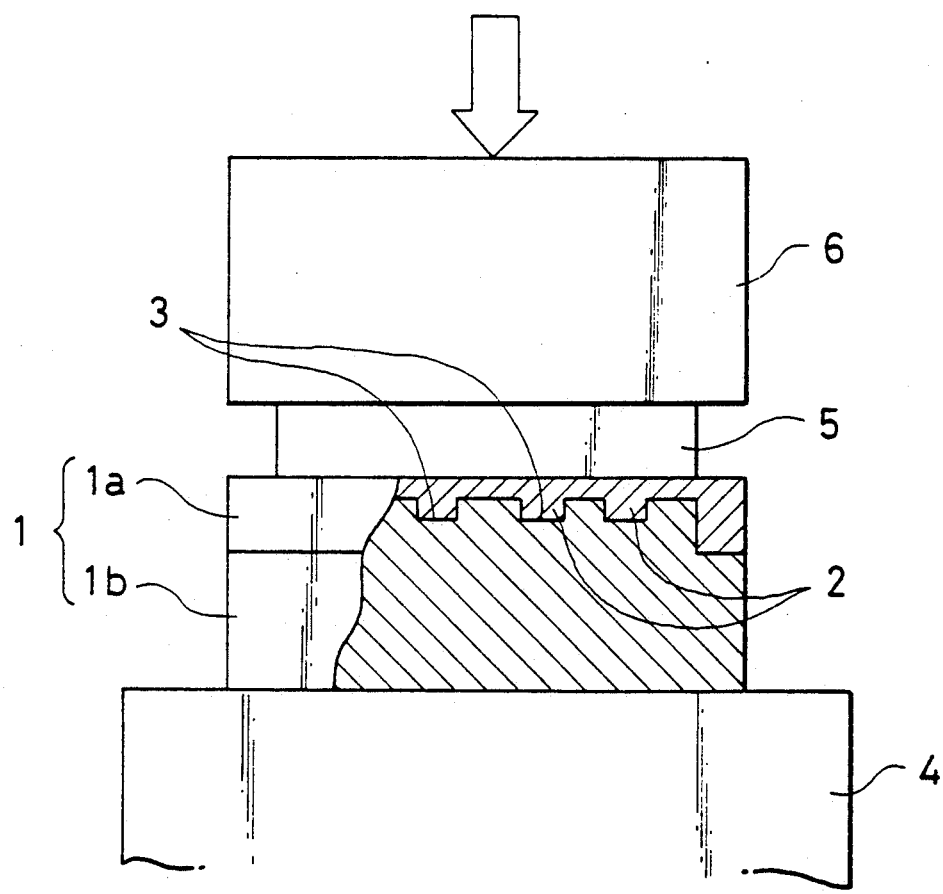
FIG. 1 is a schematic sectional view of an example of a device for conducting the die forming method according to the invention.

FIG. 1 is a schematic representation showing the arrangement of a die forming device for implementing the die forming method employing a composite die according to this invention. As shown, a disk-shaped composite die 1 consisting of two die members 1a, 1b made of different materials is mounted on a fixed table 4. The workpiece 5 is placed on top of the composite die 1 and a cylindrical ram 6 disposed above the fixed table 4 is lowered onto the workpiece 5 so as to press it onto the composite die 1. As a result, the surface of the composite die 1 in contact with the workpiece 5 is elastically deformed and the workpiece 5 is formed in the shape resulting from this deformation.

In the embodiment under discussion, the composite die 1 mounted on the fixed table 4 consists of a first die member 1a having on its bottom surface two concentric annular ridges 2 and a second die member 1b having on its top surface two annular grooves 3 with which the ridges 2 mesh. The die member 1a and die member 1b are fabricated from materials exhibiting different degrees of elastic deformation and are bonded together at the junctions between the ridges 2 and the grooves 3 so as to constitute the composite die 1.

Where a large deformation of the surface of the composite die is desired during the die forming operation, a thin first die member 1a is used in combination with a thick second die member 1b formed of a material having a degree of elastic deformation that is larger than that of the first die member 1a. Where slight local deformation is desired, a material having a small degree of elastic deformation is disposed to a greater thickness at the associated portion of the first die member 1a. In other words, the ridges 2 are formed. Varying the height of the ridges 2 varies the degree of deformation of the die surface.

When the composite die 1 fabricated in the aforesaid manner receives pressure from the workpiece 5 being formed during the forming operation, its flat surface is elastically deformed. The amount of deformation at this time is determined primarily by the magnitude of the aforesaid pressure, the Young's moduli of the die members and the thickness of the die members. Thick portions constituted of a material exhibiting a high degree of elastic deformation experience large elastic deformation, while, as mentioned earlier, thick portions constituted of a material exhibiting a low degree of elastic deformation experience small elastic deformation. Therefore, when a material exhibiting a high degree of elastic deformation and provided with local thickness variations is distributed within a material exhibiting a low degree of elastic deformation, the pressure applied during the forming operation reduces the thickness variations of the high deformation material and thus causes irregularities (hill and valleys) to appear on the surface of the die. Depending on the die support conditions, the irregularities will be either of the compressive deformation type or of the bending type.

The changes in the shape of the die surface produced by the differences in the amount of elastic deformation are very much smaller than the changes in shape occurring at the boundary between the high deformation material and the low deformation material. Because of this, it is possible to obtain a formed product having high configurational precision even when the machining precision used for fabricating the die is lower than the configurational precision required of the formed product. Although it is of course necessary for the configurational precision of the die surface to be equal to that required by the product, it is immeasurably easier to obtain a high-precision die surface configuration by the method of this invention than it is by directly imparting configuration changes to the die surface.

As high deformation materials usable for fabrication of the composite die there can be mentioned rubber, synthetic resins, aluminum alloys, copper alloys and the like. Usable low deformation materials include stainless steel and copper.

The composite die and die forming method of the invention can be used for the formation not only of synthetic resins and plastics that have been softened by heating but also of lead and other such high hardness metal materials.

The pressure received by the composite die from the workpiece is made to be lower than the yield point of the materials constituting the composite die. After the pressure is removed, therefore, the surface of the die in contact with the workpiece is restored to its initial flat condition. As a result, it is possible to impart minute shape changes to a large number of workpieces with high reproducibility.

Figure 2A:
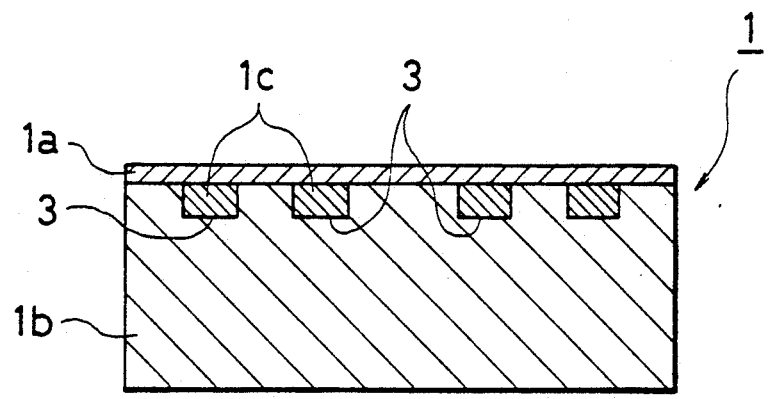
FIG. 2(a) is a sectional view of an embodiment of the composite die used in the die forming method according to the invention.

FIG. 2(a) shows another embodiment of the composite die 1 according to the invention. The composite die 1 is fabricated by forming holes or grooves 3 in the top surface of a second die member 1b, closing these holes or grooves 3 by inserting or casting into the holes or grooves 3 die members 1c constituted of material having a different degree of elastic deformation from the second die member 1b, grinding and/or polishing the common top surface of the second die member 1b and die members 1c until it becomes flat, and then bonding onto the flat surface a disk-shaped first die member 1a whose top surface is polished to a mirror finish.

A die for producing a complex configuration can be fabricated relatively easily in accordance with this embodiment of the composite die by appropriate determination of the position, shape and depth of the holes or grooves 3 and selection of the material of the die members.

Figure 2B:
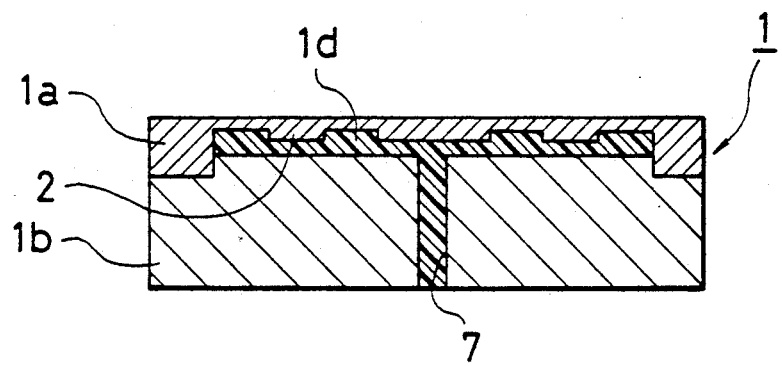
FIG. 2(b) is a sectional view of another embodiment of the composite die used in the die forming method according to the invention.

FIG. 2(b) shows another embodiment of the composite die 1 according to the invention. This die is fabricated by superposing a first die member 1a having ridges 2 on its bottom surface onto a second die member 1b such that a cavity remains between the two die members, drilling a hole 7 in the second die member 1b so as to communicate the cavity with the exterior, injecting a molten metal or resin having a different degree of elastic deformation from either the first die member 1a or the second die member 1b into the cavity to serve as a die member 1d.

With this embodiment of the composite die 1, the shaped assumed by the surface of the die during the forming operation can be freely determined by appropriate selection of the shape of the cavity and the material of the die member 1d.

Figure 2C:
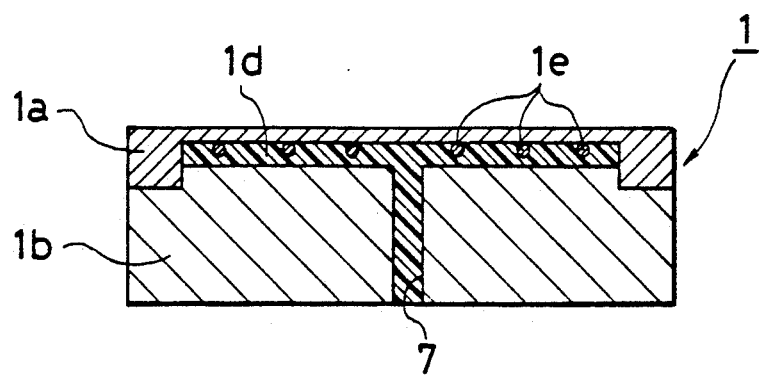
FIG. 2(c) is a sectional view of still another embodiment of the composite die used in the die forming method according to the invention.

The composite die shown in FIG. 2(c) is a modification on that shown in FIG. 2(b). In this embodiment, the bottom surface of the first die member 1a is not provided with ridges 2 but has wires or small pieces 1e attached thereto. Again, the composite die 1 is completed by injecting molten material for the die member 1d into the cavity between the first die member 1a and the second die member 1b. The degree of deformation experienced by the surface of this composite die during the forming operation will be large if the degree of elastic deformation of the die member 1d injected into the cavity is larger than that of the wires or small pieces 1e attached to the bottom surface of the first die member 1a and will be small if it is smaller.

As can be understood from the foregoing, die forming with the composite die according to this invention makes it possible to effectively utilize the elastic deformability of the die for imparting a desired configuration to the workpiece, by a simple means and without need for precision machining of the die surface. Moreover, since the desired die surface configuration can be obtained during the molding operation even when the die members of the composite die are made thick, the strength of the die can be increased for enabling it to form hard materials.

Examples of using the composite design of the invention for forging lead will now be explained.

Figure 3:
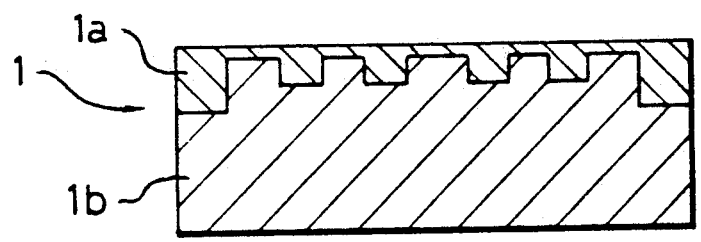
FIG. 3 is a sectional view of a composite die used in a test and showing the dimensions of the same.

As shown in FIG. 3, the composite die 1 used in this example consisted of a first die member 1a having two concentric annular ridges projecting from its bottom surface, one near the periphery and the other inward thereof, and a second die member 1b having annular grooves for receiving the ridges of the first die member 1a. The two die members were bonded together with the ridges fitted into the grooves. The first die member 1a was made from S45C carbon steel and the second die member 1b from duralumin. The dimensions of the composite die were as shown in FIG. 3.

The height of the region of this composite die in which the two die members are meshed with each other is 2.5 mm. Taking the Young's modulus of S45C carbon steel to be $21 \times 10^{10}$ PA and that of duralumin to be $7 \times 10^{10}$ PA, the difference in the amount of elastic deformation within this 2.5 mm height region can be found by calculation to be 2.0 µm.

The surface of the composite die 1 to be brought into contact with the workpiece was polished to a mirror finish using a rotary polisher and then mounted in the die forming device. As the die forming device there was used a 200-ton universal tester manufactured by Shimadzu Seisakusho, Ltd. of Japan. Before conducting the test, a parallel light beam was projected onto the surface of the composite die 1 mounted in the die forming device and the reflected image was observed for determining whether or not any irregularities corresponding to the internal ridges and grooves of the die were present on the die surface. The result of the observation was negative. A lead billet measuring 40 mm in diameter and 5.5 mm in height was placed on the composite die and an upper die formed of S45C carbon steel and measuring 50 mm in diameter and 12 mm in thickness was brought into contact with the top surface of the lead billet. The lead billet was then forged by using the tester to apply a 16-ton load (corresponding to a stress of 80 MPa) to the lead billet.

The forged lead billet had a diameter of about 50 mm. The configuration of the surface of the lead billet pressed by the composite die was examined by projecting a parallel laser beam onto the surface and observing the reflected image projected onto a screen located 1 m away. The image was found to include two bright rings at positions corresponding to those of the two annular ridges formed on the first die member. It was thus confirmed that the surface of the lead billet had been formed with two annular recesses which caused the reflected light to converge at the bright regions. A parallel light beam was similarly reflected off the surface of the die which had been pressed onto the lead billet. Observation of the reflected image showed that no irregularities had been formed on the die surface by yield deformation of the die members.

Next, a composite die was fabricated in the manner shown in FIG. 2(a). As the second die member 1b there was used a copper disk measuring 50 mm in diameter and 20 mm in thickness and provided in its surface with two concentric grooves measuring 5 mm in width and 3 mm in depth. A molten zinc-aluminum alloy was cast into the grooves and allowed to solidify, whereafter the surface of the die member was ground and polished until it becomes flat. The composite die was then completed by bonding to the flat surface a disk of roll-hardened SUS 304 stainless steel whose surface had been polished to a mirror finish. Examination of the surface of the so-fabricated composite die conducted by observing the reflected image obtained when a parallel light beam was projected thereon showed it to have a high degree of flatness.

The composite die was mounted in the die forming device used in the preceding example and a lead disk measuring 40 mm in diameter and 3.5 mm in thickness was placed thereon for die forming. A copper upper die measuring 50 mm in diameter and 20 mm in thickness was lowered onto the lead disk and forging was conducted by applying a 30-ton load.

The surface of the forged lead disk that had been in contact with the composite die retained its mirror finish. A parallel beam was projected onto this surface and the reflected image formed on a screen located 50 cm away was observed. The image was dark at the portions corresponding to the grooves of the second die member filled with zinc-aluminum alloy and bright at other portions. It was thus confirmed that minute irregularities had been successfully imparted to the surface that was to be die formed.

From the foregoing detailed description, it will understood that the invention provides a simple means for enabling the elastic deformation of a die to be effectively and easily utilized for forming a product with configurational irregularities of a microscopic magnitude virtually impossible to realize with a die forming method using a conventional die with no deformability. Moreover, since the composite die according to the invention does not have to be thin, its thickness can be increased as required for attaining the required degree of strength. As a result, the invention can be applied to the forming of hard materials exhibiting a high resistance to deformation.

While the present invention can be effectively applied in the manufacture of optical elements, ornaments that utilize light reflection and the like for imparting these articles with minute variations in configuration with high precision, it is of course not limited to these applications.

What is claimed is:

1. An elastically deformable composite die comprising a plurality of die members formed of materials exhibiting different degrees of elastic deformation under the same stress, wherein:
   one of said plurality of die members has a flat surface for contacting a workpiece to be formed;
   at least one of said plurality of die members exhibits a first degree of elastic deformation and has a plurality of recesses formed therein; and
   at least one of said plurality of die members exhibits a second degree of elastic deformation and is received in a mating configuration by at least one of said plurality of recesses such that a pressure applied to said flat surface by the workpiece during a forming operation forms a prescribed configuration of irregularities in the workpiece as a result of a prescribed irregular deformation of said flat surface.

2. An elastically deformable composite die having a flat surface for contact with a workpiece and comprising a plurality of die members formed of materials exhibiting different degrees of elastic deformation under the same stress, the die members being arranged to enable pressure received thereby from the workpiece during a forming operation to form prescribed configuration irregularities in the flat surface;
   wherein said plurality of die members comprises a first die member which has a flat top surface and a bottom surface provided with projections and is constituted of a material exhibiting a first degree of elastic deformation and a second die member which has recesses on its top surface for receiving said projections and is constituted of a material exhibiting a second degree of elastic deformation.

3. An elastically deformable die accord in to claim 1, wherein said plurality of recesses are formed in said one die member having a flat surface, said plurality of recesses being formed in a portion thereof remote from said flat surface.

4. An elastically deformable die according to claim 1, wherein said recesses comprise a plurality of concentric annular grooves.

5. An elastically deformable die according to claim 1, wherein said plurality of recesses are formed in a die which underlies said at least one die having a flat surface.

6. An elastically deformable die according to claim 5, wherein wires are attached to an underside of said at least one die having a flat surface and wherein each of said wires is received within one of said plurality of recesses.

7. An elastically deformable composite die, comprising a plurality of die members formed of materials exhibiting different degrees of elastic deformation under the same stress, one of said plurality of die members having a flat surface for contact with a workpiece to be formed, said plurality of die members being arranged so as to enable pressure received thereby from the workpiece during a forming operation to form prescribed configurational irregularities in the flat surface;
   wherein said plurality of die members comprise a first die member having a flat surface and constituted of a material exhibiting a first degree of elastic deformation, a second die member constituted of a material exhibiting a second degree of elastic deformation, and a third die member interposed between said first and second die members and constituted of a material exhibiting a third degree of elastic deformation.

8. An elastically deformable die according to claim 7, wherein said second die member has a plurality of grooves and said third die member comprises a plurality of die members inserted in said plurality of grooves.

9. An elastically deformable die according to claim 7, wherein said first die member has a bottom surface thereof provided with a plurality of ridges and said third die member has a top surface complementary to the bottom surface of said first die member.

10. An elastically deformable die according to claim 7, wherein said first die member has a bottom surface thereof provided with a plurality of wires which are embedded in said third die member.

* * * * *